Nov. 19, 1940.   C. R. DOWNS ET AL   2,221,787
METHOD AND APPARATUS FOR CONDITIONING AIR AND OTHER GASES
Filed Aug. 31, 1936   3 Sheets-Sheet 1
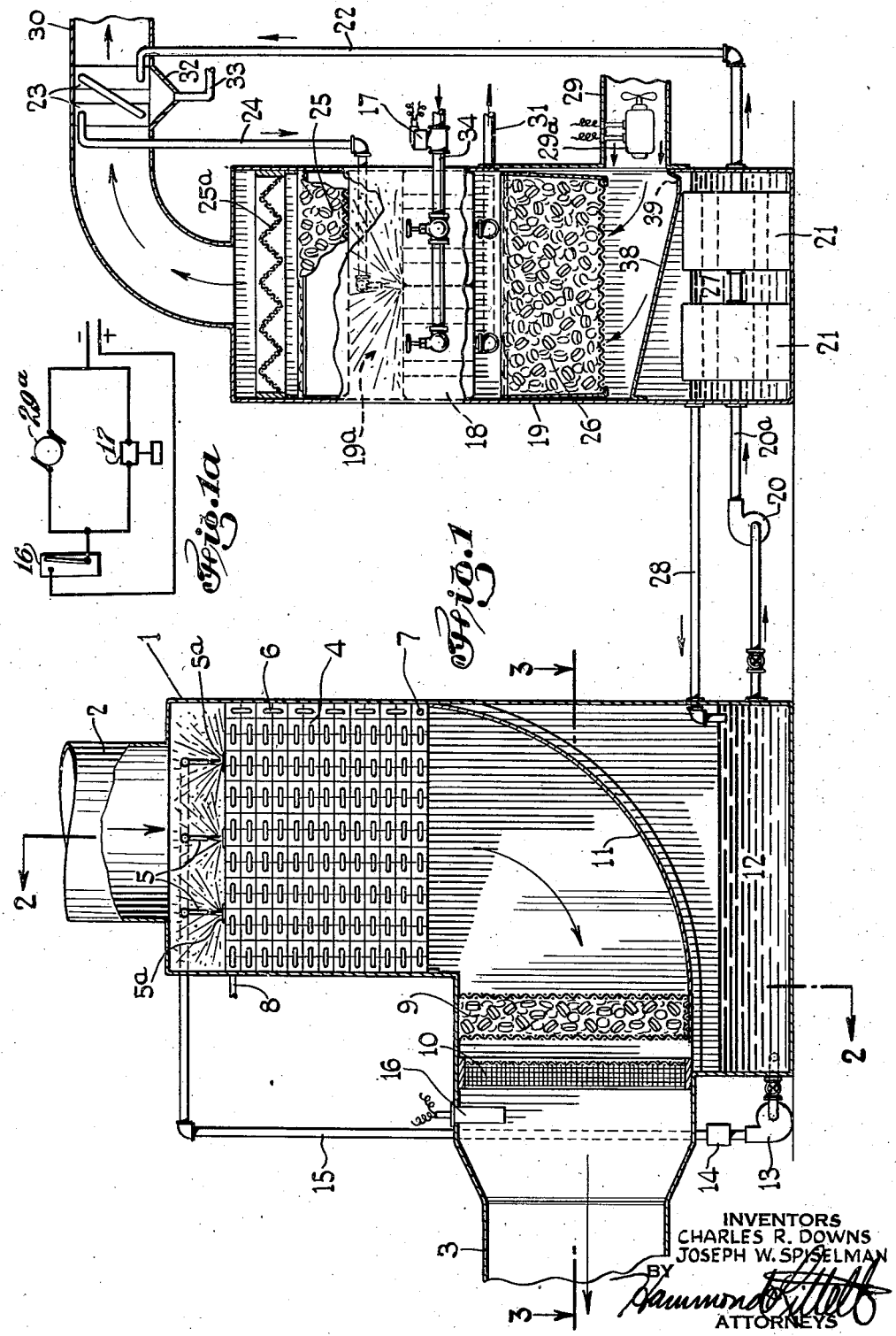
INVENTORS
CHARLES R. DOWNS
JOSEPH W. SPISELMAN
BY
ATTORNEYS

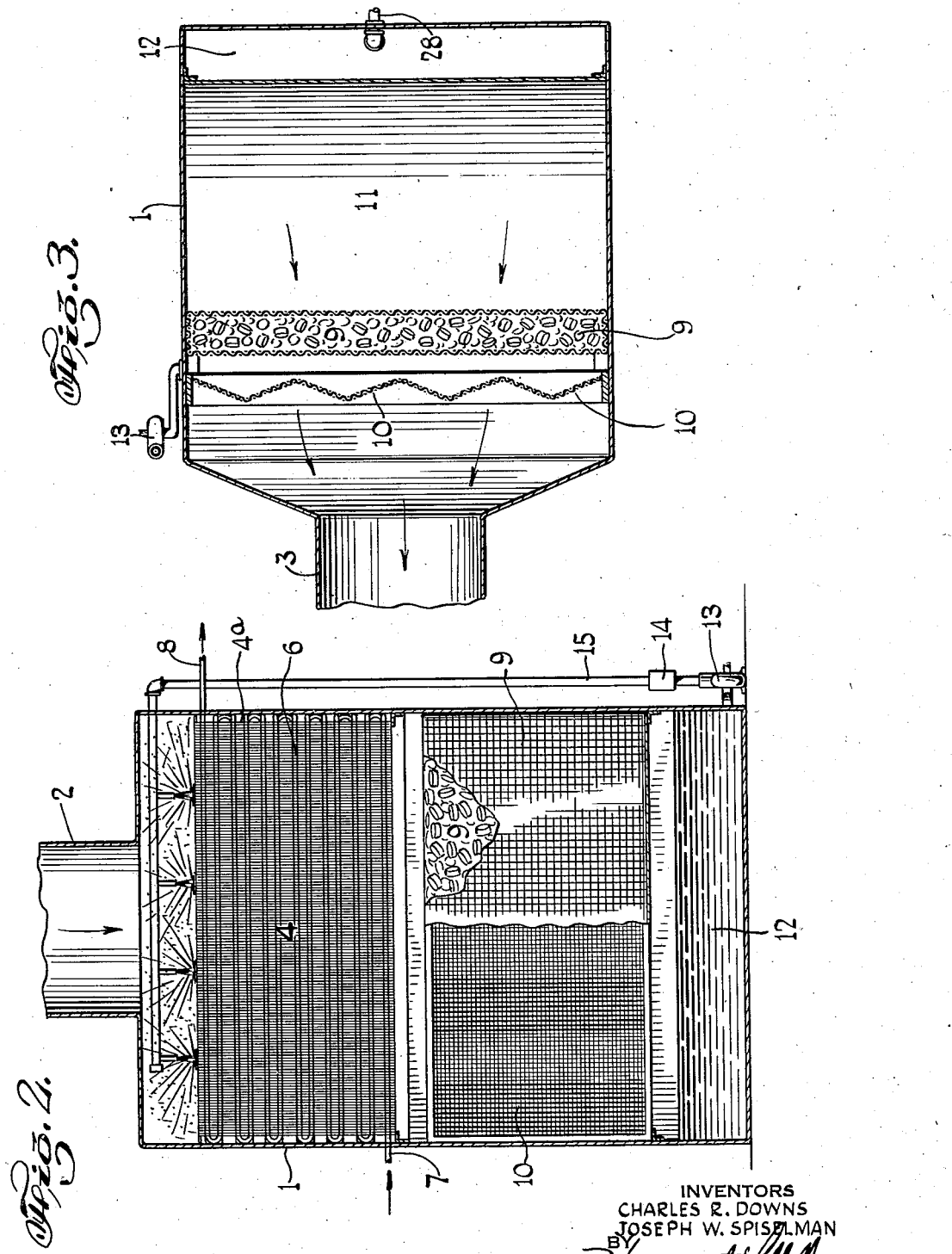

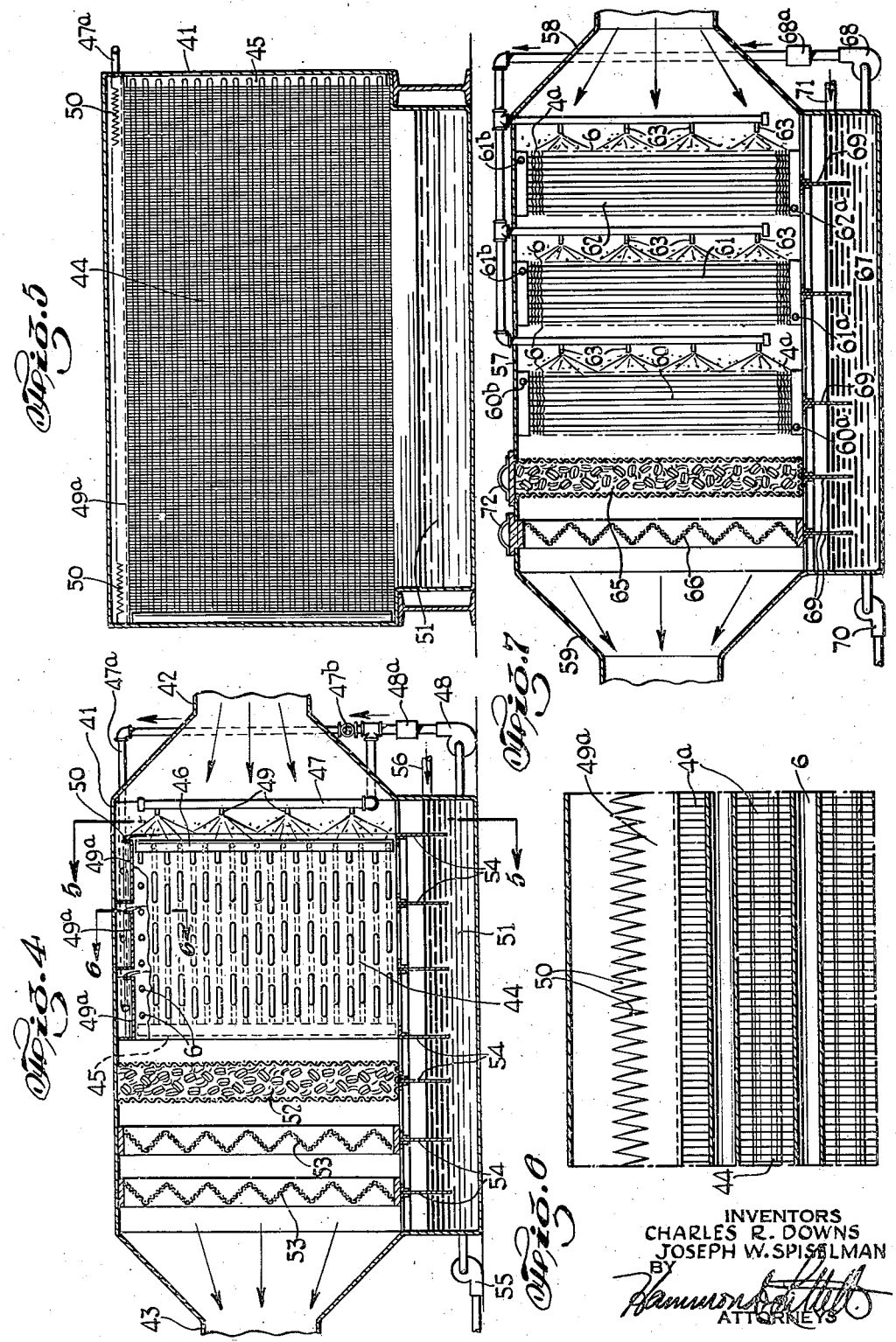

Patented Nov. 19, 1940

2,221,787

UNITED STATES PATENT OFFICE 2,221,787

METHOD AND APPARATUS FOR CONDITIONING AIR AND OTHER GASES

Charles R. Downs, Old Greenwich, Conn., and Joseph W. Spiselman, Mamaroneck, N. Y., assignors, by mesne assignments, to The Calorider Corporation, Greenwich, Conn., a corporation of Connecticut Application August 31, 1936, Serial No. 98,646

10 Claims. (Cl. 183—120)

The present invention relates to controlling the temperature and especially the humidity of air or gases to suit the comfort of individuals or to suit the requirements of manufacturing processes and the like and to removing dust and foreign odoriferous constituents from gaseous fluids. It is, in part, a continuation of our copending application Ser. No. 57,148, filed January 2, 1936.

One object of the invention is to provide an improved method and apparatus for dehumidifying air or other gas to maintain a predetermined minimum moisture content by means of a hygroscopic solution.

Another object of the invention is to provide a small, compact, inexpensive cooling and liquid phase drying apparatus of special construction, for treating by means of a hygroscopic solution large volumes of a humid gaseous fluid, such as air, flowing therethrough at a rapid rate, to dehumidify the gaseous fluid so that it will possess a water vapor pressure approximating that of the coldest portion of the hygroscopic solution within the apparatus or so that the dehumidified gaseous fluid will have a moisture content only slightly in excess of the theoretical content in equilibrium with the coldest hygroscopic solution within the apparatus.

Another object of our invention is to provide a method and apparatus in which air or other gases in thin streams is circulated in a concurrent direction with thin films of hygroscopic solution through an extended surface radiator or indirect heat transfer apparatus in which a cooling fluid is being simultaneously circulated to dehumidify the air or other gas.

Another object of our invention is to provide a method and apparatus for dehumidifying air in which the air and hygroscopic liquid being caused to flow in the same direction through the apparatus are passed in countercurrent flow to a heat exchange liquid whereby the air and hygroscopic liquid are passed in heat transfer relationship with the warmest portion of the heat transfer liquid as they enter the radiator or heat transfer apparatus and are passed in heat transfer relationship with the coldest portion of the heat transfer liquid as they leave the heat transfer and contacting apparatus.

Another object of our invention is to provide a method and apparatus for the conditioning of air by dehumidification in which the concentration and therefore the dehumidifying effect of the hygroscopic liquid is kept substantially constant by the removal of the absorbed moisture therefrom.

Another object of the invention is to provide a method and apparatus for dehumidifying a gaseous fluid such as air which incidental to its operation will also remove foreign odoriferous constituents from the gaseous fluid by causing thin streams of the gaseous fluid to impinge upon thin films of a hygroscopic solution carrying an absorbent for said odoriferous constituents.

Another object of the invention is to provide a method and apparatus for dehumidifying a gaseous fluid which incidental to the dehumidification thereof will also remove dust from the gaseous fluid by causing the dust particles at high velocity to impinge upon thin films of a viscous hygroscopic solution flowing rapidly in contact with a multiplicity of supporting surfaces.

Various other objects and advantages of our invention will appear as this description proceeds.

If a method for drying air by means of a hygroscopic solution is to be commercially efficient, it must be capable of treating large amounts of humid air per unit of time by means of a small, compact and inexpensive apparatus which will operate at the lowest possible cost to produce air of the lowest water-vapor pressure obtainable with the hygroscopic solution employed.

We have been able to satisfy the above requirement by providing a method for dehumidifying large volumes of a gesous fluid, such as air, by passing a multiplicity of thin streams of the rapidly moving air into intimate contact with large areas of thin films of a hygroscopic liquid flowing in the same general direction and from which the heat generated by moisture absorption is simultaneously and substantially instantaneously removed by indirect heat transfer with a cooling fluid of progressively decreasing temperature in the direction of flow of the hygroscopic solution. This we accomplish in a novel manner by means of a cooling device which is preferably in the form of an extended surface finned tube radiator, through the tubes of which the cooling fluid is passed countercurrent to the concurrent flow of air and hygroscopic solution and in which the solution is spread uniformly over the surfaces of the fins and the exterior surfaces of the tubes presenting an extended area of solution surface confined in a small space in heat transfer relation with the cooling fluid on one side and in intimate contact with the air flowing concurrently in thin streams on the other.

The solution and air are introduced solely into the leading face of the finned tube radiator or into the leading faces where a plurality of radiators are used in series and hence by the concurrent method the dehumidified air discharged from the cooling device cannot be rehumidified by fresh solution which has not previously been under the influence of the heat removing cooling fluid. The concurrent flow of rapidly moving air greatly accelerates the rate of flow of solution and the turbulence created in the extremely thin solution films is favorable toward the maximum rate of heat transfer to the tubes conveying the cooling fluid. This feature of concurrent flow permits the use of finned tube radiators with closely spaced fins thereby providing in a small volume the maximum of air to solution contact area and heat removing surfaces causing a very rapid equilibrium to be set up between the water vapor pressures of the air and the solution.

When a finned tube radiator is used in which the solution and air flow downwardly as shown in the drawings, concurrent flow of air under the conditions cited above permits the use of radiators with parallel fins spaced seven or more to the inch since the thin streams of air sweep the solution through the spaces even with excessive rate of charging the solution to the radiator. In a vertical unit employing the principle of concurrent flow, the air passing therethrough at a high velocity causes the solution to flow more rapidly through the radiator along with the air stream than it would by the force of gravity alone. This factor is responsible for the very thin turbulent films and is conducive to the high rate of heat removal. Likewise with a horizontal flow unit the force of the air picks up and carries the hygroscopic solution in concurrent horizontal flow with it through the radiator providing turbulent contact of air and solution and cooling surface.

The solution after it has passed through the liquid phase drying zone in which it has absorbed moisture must be enriched before returning it thereto. This may be accomplished in a variety of ways but we prefer to pass a portion of it continuously through a concentrator where the excess water therein is removed by heating it as required while passing air into intimate contact therewith. We have devised a means for this purpose whereby the amount of heat used is reduced to a minimum, thereby causing a considerable reduction in operating cost over previously known methods. This advantage will be more clearly understood from the detailed description given below.

The process is ideally suited to the removal of dust from air or other gases in that very large areas of contact are coated with viscous films. The high velocity of the dust particles suspended in the air when they impinge upon the films causes them to be removed from the air and the high velocity and turbulence of the hygroscopic liquid, such as concentrated calcium chloride solutions, flush the sludge formed off the contact areas thereby preventing fouling of the finned tube radiator. This sludge may be removed from the liquid continuously or intermittently by filters or in settling chambers. When it is desired to remove foreign odoriferous constituents from gaseous fluids, suitable absorbents, for example, finely divided activated carbon, may be suspended in the hygroscopic liquid and perform their function in the thin films within the finned tube radiator. The spent absorbent may be removed from the liquid by suitable means and fresh absorbent, preferably as a slurry in water, added as required.

Our invention is not restricted to the use of calcium chloride solutions as the hygroscopic liquid. Liquids that possess greater moisture absorptive properties cause greater amounts of heat to be liberated and require even more adequate provision for heat removal per unit of time for which our cooling device is suitable. It is also not limited to the use of a single cooling fluid since the principle of countercurrent cooling can be fulfilled by a series of separate cooling fluids of progressively decreasing temperature in the direction of flow of the air.

In the accompanying drawings which illustrate several preferred forms of embodiment of our invention:

Figure 1 is a part sectional view of the dehumidifying and reconcentrating unit illustrating the principles of our invention;

Figure 1a is diagrammatic showing of a wiring for automatic control;

Figure 2 is a sectional view along the line 2—2 of Figure 1 of the dehumidifying unit showing the principle of concurrent directional flow of the hygroscopic solution and air downwardly through an extended heat transfer surface through the tubes of which a cooling fluid is circulated upwardly in a countercurrent flow to the air and hygroscopic solution;

Figure 3 is a sectional view of the discharge portion of the dehumidifying unit on the line 3—3 of Figure 1;

Figure 4 is a sectional view of another form of dehumidifying unit in which the flow of air in a horizontal direction causes the hygroscopic solution to flow concurrently therewith through the extended surface heat transfer apparatus, and the cooling fluid flows through the heat transfer apparatus countercurrent to the direction of flow of the air and hygroscopic solution;

Figure 5 is a sectional view on the line 5—5 of Figure 4;

Figure 6 is an enlarged sectional detail on the line 6—6 of the heat transfer apparatus of Figure 4 illustrating the extended surface and cooling fluid conduits and overflow lip of the solution-feed weir; and Figure 7 is a further modified form illustrating the horizontal flow of the air and hygroscopic solution in a concurrent direction through the heat exchange apparatus.

In the embodiment of our invention illustrated in Figures 1 to 3, inclusive, the dehumidification unit consists of the casing 1 having an inlet 2 for the air to be dehumidified and an outlet 3 from which the dehumidified air is discharged into suitable ducts leading it to the space to be conditioned. It is to be understood that any suitable form of blower may be used in either the inlet 2 or outlet 3 for circulating the air through the conditioning unit and into the space to be conditioned. Within the casing 1, an extended surface indirect heat transfer radiator 4 is located so as to receive the hygroscopic solution which is uniformly sprayed over the top thereof by means of the nozzles 5 and atomizing impingement targets 5a. The extended surface radiator or heat transfer apparatus 4 is preferably of the fin and tube type illustrated in Figures 1 and 2 in which water or other cooling fluid is circulated in a continuous tortuous path through the tubes or primary cooling surfaces 6 from the inlet 7 at the bottom of the radiator to the outlet 8 at the top thereof in a countercurrent direction to the air flow. The tubes 6 are located as near together as possible and are preferably of small diameter. We have found tubes one-fourth to one-half of an inch in diameter spaced approximately three-quarters to one inch on centers satisfactory for our purpose. The fin members or secondary cooling surfaces 4a, which are in heat transfer contact with the tubes 6, are preferably spaced about 8 fins per inch. Figure 9 shows a section of a radiator of this type shown to one-half scale. While there is nothing critical in the dimensions given, it is desirable, in order to accomplish the objects of our invention, that the hygroscopic solution and the air be passed over and through an extended surface heat transfer apparatus in which the secondary cooling surfaces exceed the primary surfaces and of which the radiator 4 is intended as sufficiently illustrative, in such manner that the air in thin streams between the fins or secondary surfaces 4a contacts with the hygroscopic solution in very thin films on the fins 4a and the tubes 6 and that the films are in optimum heat transfer relation with the heat removing surfaces of the fins and tubes and the tube areas or primary cooling surfaces are adequate to transfer the heat to the cooling fluid. It will be clear that the extended surface heat transfer apparatus need not be a fin and tube type of radiator, but other types of extended surface heat transfer apparatus may be used.

In this manner, the air to be dehumidified is caused to contact with thin films of the hygroscopic solution which are caused to flow rapidly by the air streams over the heat transfer surfaces of the radiator 4, so that as the solution absorbs heat as latent heat given off in the condensation of the water vapor from the air, this heat is simultaneously transferred to the heat conducting surfaces of the radiator 4 and withdrawn by the water or other cooling fluid circulating through the radiator 4 in tubes 6 thereby preventing any substantial rise in temperature of solution. As the cooling water or other fluid circulates through the radiator 4 from the bottom to the top, i. e. in a direction countercurrent to the flow of the air and hygroscopic solution, the concurrently flowing air and hygroscopic solution are progressively cooled in their passage through the radiator 4 and separate from each other beyond the radiator 4 at the lowest temperature and greatest degree of dehumidification of the air reached within the radiator 4.

Below the radiator 4, the high velocity thin streams of air kept separate in the radiator join together into a common stream of reduced speed; and the solution which has been maintained in very thin films in the radiator coalesces into relatively thick streams resulting in breaking of the intimacy of contact of air and solution and facilitating their separation. The air is preferably deflected by an air directionating baffle 11 toward the outlet duct 3. The coalesced solution in streams drips onto the curved baffle 11 and flows down into the pool 12. Those streams of liquid falling most perpendicular to the baffle 11 cause some splashing. We have found from experience that dust removed from the air and other suspended material is thrown by such splashing into the air stream and to prevent this from causing stoppage of a fine spray eliminator, we provide a basket of Raschig rings 9 to act as a splash eliminator. Despite the fact that the Raschig rings are wetted by thin films of the solution, neither the temperature of the air nor its moisture content is altered while passing therethrough because the system is already in equilibrium. The air then passes through the fine spray eliminator 10 which is preferably of the glass wool type and discharged into duct 3. The air baffle 11 may be a metal plate or composed of materials designed to deaden the sound of the splashing liquid. Instead of Raschig rings in basket 9 other suitable splash eliminating forms can be used and they may even possess chemical absorbent properties for removing reactive gases or odors from the air and/or to affect the chemical properties of the hygroscopic solution.

In our invention, by passing the hygroscopic solution and the air in concurrent flow through the radiator 4, the temperature at which the solution is sprayed into the contact chamber, the sensible heat of the entering air and the initial latent heat of condensation have relatively little effect for the hygroscopic solution and the air quickly reach the temperature prevailing in the upper portion of the extended surface heat transfer unit by transfer of heat to the cooling fluid flowing toward the outlet of radiator 4. The air and hygroscopic solution then are further cooled in their progress downwardly through the radiator 4 in which the cooling water flows in countercurrent direction so that the air is discharged from the bottom of the radiator 4 at its lowest temperature and greatest degree of dehumidification. The hygroscopic solution is likewise discharged at its lowest temperature so that on baffle 11 and eliminators 9 and 10 reheating or rehumidifying of the air is avoided as the system is in equilibrium at those points.

If the air flow should be reversed and passed countercurrent to the flow of the hygroscopic solution through the radiator, the solution, such as one containing 40% calcium chloride, despite its high gravity, is prevented from flowing freely, the radiator is flooded, only a portion of the spaces is free for air passage, the resistance to flow of air is greatly increased and its rate of flow reduced, the contact area between air and solution is greatly reduced and the available heat transfer surface is proportionately diminished.

A pump 13 continuously withdraws hygroscopic solution from the pool 12 in the bottom of the casing 1 and pumps it through the strainer 14 and pipe 15 to the distributing nozzles 5 in the top of the casing 1. The solution is picked up and carried along the air currents and caused to flow rapidly and continuously through the radiator 4 in concurrent flow with the entering air as described above. We have illustrated an impingement type of spray nozzle, but it is understood that any suitable means for distributing the solution uniformly may be used.

In order to remove the moisture which is taken out of the air by the hygroscopic solution and to maintain the concentration of the hygroscopic solution at a point such that it will effect the desired degree of dehumidification of the entering air, automatically controlled means are provided for suitably reconcentrating the hygroscopic solution. To effect the control automatically, a humidostat 16 is located in the air discharge end of the conditioning apparatus adjacent the outlet duct 3, and this humidostat is set for a specified degree of relative humidity. When the humidostat 16 is set for a relative humidity of 40% for example, as long as the air discharged from the apparatus 1 is at a relative humidity of 40% or lower, there is no occasion to effect reconcentration of the hygroscopic solution. As the solution becomes diluted with absorbed water and its vapor pressure rises, the relative humidity of the air discharged from the apparatus 1 rises above 40% and it becomes necessary to effect a reconcentration of part of the hygroscopic solution so that the hygroscopic solution will be able to reduce the humidity of the air passing through the apparatus to a relative humidity of 40%. Therefore, when the relative humidity rises above 40% the humidostat 16 will operate automatically to open the valve 17 to permit steam or other heating fluid to flow through the heat transfer elements 18 in the reconcentrator 19.

During the operation of the conditioning apparatus, a pump 20 continuously operates to withdraw a portion of the hygroscopic solution circulating through the conditioning apparatus. We have found it preferable for ordinary air conditioning purposes to withdraw from one-fifth to one-sixth of the volume of the solution circulated through the air conditioning apparatus 1 for circulation through the reconcentrator 19, suitable valves being provided to regulate this amount. The solution flows from the pump 20 through the bottom of the reconcentrator 19 where it flows through an immersed heat transfer device 21 and thence through the pipe 22 to a heat exchange unit 23 located in the outlet from the reconcentrator 19. From the heat exchange unit 23 it flows through the pipe 24 to the top of the reconcentrator 19 where it is distributed as sprays 19a over the steam radiator 18 from which it flows downwardly through a bed of Raschig rings 26 and over plate 38 and through hole 39 into a pool 27 at the bottom of the reconcentrator 19. In this pool it flows in contact with heat exchanger 21 and then preferably by gravity through the pipe 28 into the pool 12 in the bottom of the casing 1.

Air for effecting reconcentration of the hygroscopic solution is blown through the reconcentrator 19 from the duct 29 whence it passes upwardly in countercurrent flow to the solution to be reconcentrated through Raschig ring bed 26 and the steam radiator 18, thence through a Raschig ring eliminator 25 and fine eliminator 25a and heat exchanger 23 and is discharged from the outlet 30 of the reconcentrator preferably outdoors.

As long as no reconcentration of the hygroscopic solution in the conditioning apparatus is necessary, the hygroscopic solution flows constantly through the principal recirculating cycle established by the pool 12, pump 13, pipe 15 and nozzles 5, and at the same time from one-fifth to one-sixth of this volume of hygroscopic solution is forced by the pump 20 through the circuit established by the immersed heat transfer device 21, pipe 22, heat exchange unit 23, pipe 24, etc., through the reconcentrator 19 where it flows back by way of pipe 28 to the bottom of the conditioning unit. When the concentration of the hygroscopic solution drops below that at which it will dehumidify the air passing through the conditioning unit 1 to the degree of relative humidity for which the humidostat 16 is set, the humidostat 16 causes the valve 17 to open to permit live steam, hot water or other heating fluid to flow from pipe 34 through the radiator 18 where it is discharged from the pipe 31 and also starts a blower which forces air through the inlet duct 29 and out through the discharge duct 30 of the reconcentrator 19. Suitable electrical connections extend between the terminals indicated for the humidostat 16, the valve 17, the motor 29a and a source of suitable electrical potential to cause the valve 17 to open and the motor 29a to start when this circuit is energized by the operation of the humidostat 16 caused by the air passing the humidostat 16 exceeding the relative humidity for which the humidostat is set.

A diagram of this electric circuit is shown in Fig. 1a.

In this manner, the hygroscopic solution flowing through the reconcentrator is heated by the steam or other heating medium in the radiator 18 to a point at which the air which is blown through the reconcentrator extracts moisture from the hygroscopic solution and reconcentrates the hygroscopic solution. The reconcentrated solution flows back from the reconcentrator 19 through the pipe 28 into the pool 12 where it mixes with the larger volume of hygroscopic solution and is circulated by the pump 13 through the fin tube radiator 4 in the manner previously described. The operation of the reconcentrator continues until the principal body of hygroscopic solution in the casing 1 is reconcentrated to a point such that it again is able to discharge air at a relative humidity lower than the setting of the humidostat 16 whereupon the humidostat operates to close the valve 17 to shut off the flow of steam to the radiator 18 and to shut off the blower by which the air is forced through the reconcentrator 19. Under certain operating conditions the blower may be allowed to operate continuously and the humidostat will control only the valve 17. A modulating humidostat controlling a modulating valve 17, whereby a modulated continuous reconcentration of the hygroscopic solution is effected, may be used.

This cycle of heat exchange between solution entering reconcentrator 19 and solution and air leaving reconcentrator 19 effects an important economy of heat, and in addition allows a cool solution to flow back to pool 12 of air conditioning apparatus 1. Due to factors of construction, and the physical limitations of heat transfer, the solution flowing back to pool 12 from reconcentrator 19 may be warmer than the solution flowing from baffle 11 into pool 12, causing a warmer solution than that on baffle 11 to be discharged from nozzles 5. In our invention, this will have no deleterious effect inasmuch as this additional heat will be removed in the uppermost layer of radiator 4, as previously described, and the air and cooled solution then continue to flow concurrently into progressively colder portions of radiator 4.

The method and apparatus hereinbefore described for reconcentrating the solution are disclosed and claimed in our companion application, Serial No. 144,630, filed May 25, 1937.

In the embodiment of our invention, which is illustrated in Figures 4 to 7, inclusive, we have applied the principle of concurrent directional flow of the air to be dehumidified and the hygroscopic solution, and of countercurrent flow of the cooling fluid through the cooling device to air conditioning units in which the air flow is horizontal.

Referring particularly to Figures 4 to 6, inclusive, the air conditioning unit consists of the casing 41 as illustrated having air inlet 42 into which the air to be conditioned is caused to flow, and an air discharge duct 43 through which the conditioned air is discharged or conducted into the space to be conditioned, suitable blowers being used to force the air through the ducts 42 and 43 and the conditioning apparatus 41. Within the conditioning apparatus 41 an extended surface indirect heat transfer radiator or cooling device 44 is located so that the air flows in a horizontal direction therethrough while the cooling fluid, such as water, is caused to enter at the downstream face of the radiator 44 through the inlet header 45 and to discharge from the radiator through the outlet header 46 so that the water flows through the radiator 44 in a direction countercurrent to the flow of the air. The hygroscopic solution enters the conditioning unit 41 from the pipe 47 into which it is pumped by the pump 48 through the strainer or filter 48a for removing accumulated dust in the form of sludge and is distributed to a plurality of spray nozzles 49 which spray it into the air stream at the upstream face of the radiator 44. To further assist in distributing the solution over the radiator at the top, horizontal discharge troughs 49a may be provided having weirs 50 over which the hygroscopic solution flows into the upstream face of the radiator 44 and to other relatively upstream portions and then down over the fins and cooling pipes. A valve 47b may be used to regulate the flow of solution to troughs 49a and to insure ample pressure on the spray nozzles 49. In this manner the solution is swept concurrently in a plurality of thin films over the surfaces of the radiator by the thin streams of air in the direction of the air flow. The air and solution thus flow progressively into colder portions of radiator 44 as the air flows toward the outlet of casing 41. The hygroscopic solution flowing through the radiator 44 is discharged into the pool 51, while the air leaving the radiator 44 passes through eliminators 52 and 53 in which entrained hygroscopic solution is deposited, and flows down into the pool 51. From the bottom of the radiator 44 and from the bottom of the spray eliminators 52 and 53, curtains 54 dip down into the pool of hygroscopic solution 51 so as to prevent the air from by-passing the radiator 44 and eliminators 52 and 53.

A pump 55 is used to pump a portion of the solution in the pool 51 through a reconcentrator similar to the reconcentrator 19 in Figure 1 and the reconcentrated hygroscopic solution flows back into the pool 51 from the pipe 56 after having been reconcentrated in the reconcentrator 19. The reconcentrator is controlled in a manner similar to that previously described.

Figure 6 shows an enlarged sectional view of one of the troughs 49a and the upper portion of the radiator 44 and illustrates how the hygroscopic solution flowing over the weirs 50 and from the nozzles 49 is divided into a plurality of thin films by the fins 4a and how the air is divided into a similar number of fine streams by the fins 4a and tubes 6 so that the air and solution flow concurrently through the radiator intimately contacting in fine streams which efficiently and quickly remove the moisture from the air and at the same time convey the heat generated to the cooling fluid circulating through the tubes 6.

In Figure 7, another embodiment of our invention is shown illustrating the concurrent flow of hygroscopic solution with a horizontal flow of air. The air conditioning unit consists of the casing 57 having an air inlet 58 into which the air to be conditioned is caused to flow, and an air discharge duct 59 through which the dehumidified air is discharged, suitable blowers being used to force the air through the unit. Within the casing 57, extended surface indirect heat transfer radiators 60, 61 and 62 are located so that the air flows in a horizontal direction therethrough from radiator 62 to radiator 60. A cooling fluid is caused to pass into inlet 60a of radiator 60 and leave by outlet 60b, then passing to inlet 61a of radiator 61 and leave by 61b, thence to inlet 62a of radiator 62 and leave by 62b. In this manner, a countercurrent flow of cooling fluid to the air stream is established. Countercurrent cooling may also be effected by the use of two or more separate cooling fluids, with the use of the coldest fluid in radiator 60, the warmest in 62 and of intermediate temperature in radiator 61.

Hygroscopic solution is sprayed through atomizing sprays 63 onto the fins 4a of radiators 60, 61 and 62 at the upstream faces. These fins lie in horizontal planes with tubes 6 in vertical planes. Preferably the fins 4a are given a wavy contour as indicated at the top and bottom of the respective radiators to create turbulent flow and to effect better distribution of the hygroscopic solution over their surfaces. The hygroscopic solution is pumped from pool 67, through pump 68 and filter 68a to the atomizing sprays 63 and passes into the leading faces of the radiators 60, 61 and 62. The air flowing through the radiators carries the hygroscopic solution in a horizontal concurrent direction through each radiator, and the force of the air current is such as to distribute the solution to maintain both the upper and lower surfaces of the fins 4a wetted by the solution. In this manner, extremely thin films of solution on the surfaces of the heat extracting fins 4a and tubes 6 are exposed to the air flowing through the apparatus, and as moisture is removed from the air by its contact with hygroscopic solution, the heat liberated is immediately removed by the heat extracting fins 4a and tubes 6 to the cooling fluid within tubes 6. Both the air and hygroscopic liquid are cooled progressively in their concurrent flow from the face of radiator 62 to the end of radiator 60 by the countercurrent flow of cooling fluid so that the coolest air and coolest solution are discharged at the downstream face of radiator 60.

The air discharged from radiator 60 passes through eliminators 65 and 66, the first of which may be of the Raschig ring type, to outlet 59 of casing 57. Depending curtains 69 dip into pool 67 from the radiators 60, 61 and 62, and from the eliminators 65 and 66 to prevent by-passing of air over the pool and under the eliminators. Removable handplates 72 are provided to allow the removal for renewal or cleaning purposes of eliminators 65 and 66. A pump 70 is used to pump a portion of the solution in pool 67 through a reconcentrator similar to the reconcentrator 19, Figure 1, and the reconcentrated hygroscopic solution flows back into pool 67 from pipe 71 after reconcentration in reconcentrator 19. The reconcentrator is controlled in a manner similar to that previously described.

In this embodiment, as in the previous ones described, the air is maintained in a plurality of thin streams by the fins 4a as shown in Figure 5 and Figure 6 of the radiator 44 and the solution is spread out in very thin films on the fins 4a and on the tubes 6 so that the air and hygroscopic solution flowing in a concurrent direction are exposed to the heat conducting action of the fins 4a and of the tubes 6 through which cooling water is circulated. The latent heat of condensation therefore is removed simultaneously with its generation in the hygroscopic solution, and a portion of the sensible heat of the air may be likewise removed in its flow through the radiators 62, 61 and 60. Inasmuch as the cooling water enters at the left or downstream end of the radiator 60 and flows out at the right or upstream end of radiator 62, the cooling water flows countercurrent to the flow of the air and the hygroscopic solution so that the hygroscopic solution and the air are gradually decreased in temperature in their flow through the series of radiators and the principles which prevail in the operation of the construction described in Figure 1 prevail also in operation of the construction described in Figures 4 to 7.

As is clear from the foregoing description, the process and apparatus of the present invention offer many novel advantages. The apparatus is compact and efficient and liquid phase drying, wherein the air and solution are caused to contact with each other in a plurality of concurrent small streams, is particularly effective.

The large amounts of moisture absorbed from large volumes of air passed through the contact unit generate large quantities of heat, per unit of time, principally as latent heat of condensation. This heat is removed from the hygroscopic liquid at the moment of its formation, thereby preventing the temperature of the solution from increasing and thus maintaining its ability to absorb further moisture from the air. The process provides for this rapid removal of heat by causing the hygroscopic liquid, as well as the cooling fluid, to flow rapidly in contact with opposite faces of a metal separating surface of high thermal conductivity so that heat transfer will not be retarded by stagnant liquid films. The hygroscopic liquid is spread over a very large area to provide adequate contact surfaces between air and liquid and the liquid is distributed uniformly over all of the contact area. The liquid is caused to take the form of thin films in turbulent motion by the flow of air through the device. The rate at which the liquid is introduced into the finned tube radiator should of course not be so low as to cause excessive dilution of the liquid by the absorbed moisture, otherwise the moisture absorbing capacity of the liquid is reduced resulting in inefficient drying of the air. Excessively large introduction rates of the liquid are not required thereby reducing the cost of conveying and distributing the liquid to form the absorption films by means of a small pump. No contact between the dehumidified air and liquid of a higher vapor pressure is permitted. The hygroscopic liquid, while absorbing moisture from the air, progressively moves into heat transfer relation with the coldest cooling fluid and separates therefrom at the lowest temperature. When an adequate introduction rate for the liquid is provided, the coldest hygroscopic liquid in the device will then have the lowest vapor pressure. The resistance to air flow is very low thereby saving power. These novel features permit the use of equipment of low weight and small volume of structural parts.

While we have illustrated and described the principles of our invention as applied to several forms of apparatus using any preferred hygroscopic liquid, it will be understood that in the figures of the drawings the apparatus is shown merely for the purposes of illustration and that various other forms of arrangement and other forms of apparatus may be used while still operating in accordance with the principles of our invention within the scope of the claims appended hereto.

We claim:

1. The method of dehumidifying air which includes distributing relatively concentrated hygroscopic solution in finely divided form substantially uniformly throughout a flowing mass of air to form a mixture, conducting said mixture between and in contact with closely spaced, thin, heat absorbing elements on which said solution spreads as thin films flowing in the same general direction with currents of said air, continuously abstracting the heat of moisture absorption by said elements and transferring said heat by conduction to walls cooled by a cooling liquid, and preventing rehumidification of the treated air by separating said solution from said air immediately upon leaving said elements.

2. The method of dehumidifying gaseous fluids such as air which includes distributing a hygroscopic solution throughout a current of said gaseous fluid to form an intimate mixture in which latent heat of moisture absorption causes warming of the solution, preserving intimate contact of the solution and gaseous fluid of said mixture in divided form by flowing them in the same general direction through the passages of an extended surface cooling zone, progressively removing the heat of moisture absorption from said mixture within said cooling zone by circulating a cooling liquid through said cooling zone in indirect heat exchange relationship to the flowing mixture and counter-current to the flow of said mixture, and separating the gaseous fluid from the hygroscopic solution at the lowest temperature reached.

3. The method of dehumidifying air which includes atomizing a cool, relatively concentrated hygroscopic solution throughout a flowing mass of said air, baffling said air by closely spaced heat removing surfaces to coalesce a substantial portion of said atomized solution into a multiplicity of thin films flowing confluently with said air over said surfaces and to remove the heat of moisture absorption, separating said air from the diluted solution at the lowest temperature reached while in contact with each other, and maintaining the concentration of said diluted solution substantially constant to give a selected relative humidity of said separated air.

4. The method of producing dehumidified air which includes continuously circulating a hygroscopic solution through a moisture absorbing zone where it flows as thin films over cooling surfaces, passing streams of air over said surfaces at high velocity to facilitate the flow of said films in the same general direction as the air streams, removing through said surfaces the heat resulting from the absorption of moisture from said air by said solution, immediately separating the solution from the dehumidified air, maintaining the concentration of said solution by circulation through an evaporating zone, and controlling the supply of heat to said evaporating zone according to the relative humidity of said dehumidified air.

5. An apparatus for dehumidifying air including a casing provided with an air inlet, a mixing chamber adjacent to said air inlet and having spraying means for relatively concentrated hygroscopic solution, an extended surface cooler coacting with the casing to prevent air by-passing said extended surface of said cooler whereby all of the air and solution flow in the same general direction over said cooler, a separating chamber, a spray eliminator and an air outlet all arranged in series in the order named, a reservoir adapted to receive said solution from said separating chamber, a circulating means to remove solution from said reservoir and discharge it to said spraying means, a water evaporator provided with a heating means, means to circulate the solution of said reservoir through said evaporator, and means responsive to relative humidity of air delivered through said outlet for controlling the heat delivered to said heating means.

6. An air dehumidifying apparatus including a pair of casings each having an extended surface heat interchanger, an air inlet on one side, and an air outlet on the other side for the flow of a separate current of air through each casing and over the heat interchanger therein, means for delivering a cooling medium to one of said interchangers, means for delivering a heating medium to the other interchanger, a reservoir for hygroscopic solution, means for delivering solution from said reservoir and spraying a portion of it into air at the air inlet of the casing having the cooled interchanger for flow over the latter confluently with the air, and spraying another portion of it into air at the air outlet side of the heated interchanger for flow over the latter countercurrent to the air, means for returning solution flowing from both interchangers to said reservoir, and means for controlling the amount of water removed from the solution by the air passing over the heated interchanger in accordance with the amount of water absorbed by the solution from the air passing over the cooled interchanger.

7. An air dehumidifying apparatus including a casing having an air inlet and an air outlet, a mixing chamber adjacent to said air inlet, spray nozzles for delivering hygroscopic solution into said mixing chamber, a separating chamber adjacent to said outlet and a cooling radiator extending across said casing between said mixing chamber and said separating chamber and having closely spaced extended surfaces, a spray eliminator associated with said air outlet, a reservoir receiving hygroscopic solution from said separating chamber, a reconcentrator having heating means, means for delivering hygroscopic solution from said reservoir in contact with said heating means to concentrate the same, a blower to pass air in contact with the solution on said heating means, and means for delivering reconcentrated solution to said spray nozzles.

8. An air dehumidifying apparatus including a casing having an air inlet at the top, a lateral air outlet from the lower portion, a mixing chamber adjacent to said air inlet and a separating chamber adjacent to said outlet, spraying nozzles for delivering hygroscopic liquid into said mixing chamber, a cooling radiator extending across said casing below said mixing chamber and having a cooling liquid inlet at the lower end, a cooling liquid outlet at the upper end, and closely spaced extended surfaces distributed across the entire cross section of said casing and over which the downward flow of said hygroscopic liquid is accelerated by the air flowing downwardly in the same general direction, said radiator effecting progressive heat removal and progressive moisture absorption by said hygroscopic liquid from said air during said downward flow, a spray eliminator associated with said outlet and out of the direct path of the descending liquid, a reservoir receiving hygroscopic liquid from said separating chamber and said spray eliminator, a reconcentrator, a liquid cooler, means for delivering hygroscopic liquid from said reservoir to said reconcentrator, means for returning reconcentrated liquid from said concentrator through said cooler to said reservoir, and means for returning hygroscopic liquid from said reservoir to said spray nozzles.

9. An air dehumidifying apparatus including a casing having an air inlet and an air outlet, means for distributing hygroscopic liquid across said casing adjacent to said inlet, a cooling radiator extending entirely across said casing and having an inlet for cooling liquid at the end farthest from said air inlet, and having closely spaced extended surfaces over which all of the intimate mixture of the air from said air inlet and finely divided hygroscopic liquid from said distributing means flow in intimate contact with each other in the same general direction and countercurrent to the cooling liquid to effect progressive heat removal from said mixture and progressive moisture absorption by said hygroscopic liquid from said air, a separating chamber after said cooling radiator to separate the air and diluted hygroscopic liquid at the lowest temperature reached, a spray eliminator associated with said outlet, a reservoir receiving diluted hygroscopic liquid from said separating chamber and spray eliminator, means for reconcentrating said diluted liquid, and means for returning concentrated liquid to said distributing means.

10. An apparatus for dehumidifying air including a casing provided with an air inlet, a mixing chamber adjacent to said air inlet and having spraying means for relatively concentrated hygroscopic solution, an extended surface cooler coacting with the casing to prevent air by-passing said extended surface of said cooler whereby all of the air and solution flow in the same general direction over said cooler, said cooler having a cooling liquid inlet at the end farthest from said air inlet whereby the cooling liquid flows counter to the flow of air and hygroscopic solution, a separating chamber, a spray eliminator and an air outlet all arranged in series in the order named, a reservoir adapted to receive said solution from said separating chamber, a circulating means to remove solution from said reservoir and discharge it to said spraying means, a water evaporator provided with a heating means, and means to circulate solution from said reservoir through said evaporator to reconcentrate the solution.

CHARLES R. DOWNS.
JOSEPH W. SPISELMAN.